US005609760A

United States Patent [19]
Leach

[11] Patent Number: 5,609,760
[45] Date of Patent: Mar. 11, 1997

[54] OIL FILTERING SYSTEM FOR BILGE WATER OF MARINE VESSELS

[76] Inventor: James T. Leach, 2300 E. Lucas, Beaumont, Tex. 77703

[21] Appl. No.: 431,433

[22] Filed: May 1, 1995

[51] Int. Cl.⁶ ................................................. B01D 35/02
[52] U.S. Cl. ................ 210/416.1; 210/448; 210/497.01; 210/924
[58] Field of Search ................................ 210/232, 416.1, 210/448, 483, 497.01, 693, 799, 924, 438

[56] References Cited

U.S. PATENT DOCUMENTS

| | | | |
|---|---|---|---|
| 3,847,821 | 11/1974 | Krueger | 210/488 |
| 4,058,463 | 11/1977 | Bartik | 210/497.01 |
| 5,417,855 | 5/1995 | Gershenson | 210/483 |

*Primary Examiner*—Ivars Cintins
*Attorney, Agent, or Firm*—Bush, Riddle & Jackson, L.L.P.

[57] ABSTRACT

A bilge water filter having an elongate tubular housing defining a bilge water outlet and adapted to receive a filter and filter support assembly which is secured in sealed relation therewith by manual retainer elements. The filter and filter support assembly defines an inlet through which is caused to flow bilge water of a marine vessel which may contaminated by oil and other petroleum products. The filter and filter support assembly incorporates an elongate, tubular perforate filter support element about which is positioned and secured a generally cylindrical closed end body of a thick filter media in the form of meltblown polypropylene (polyolefin hydrocarbon). The filter assemblies may be incorporated in valve controlled banks and may be controlled by valve settings to utilize the filters independently, sequentially or together to accomplish separation of oil from the bilge water to thus insure an overboard discharge of oil free bilge water.

10 Claims, 3 Drawing Sheets

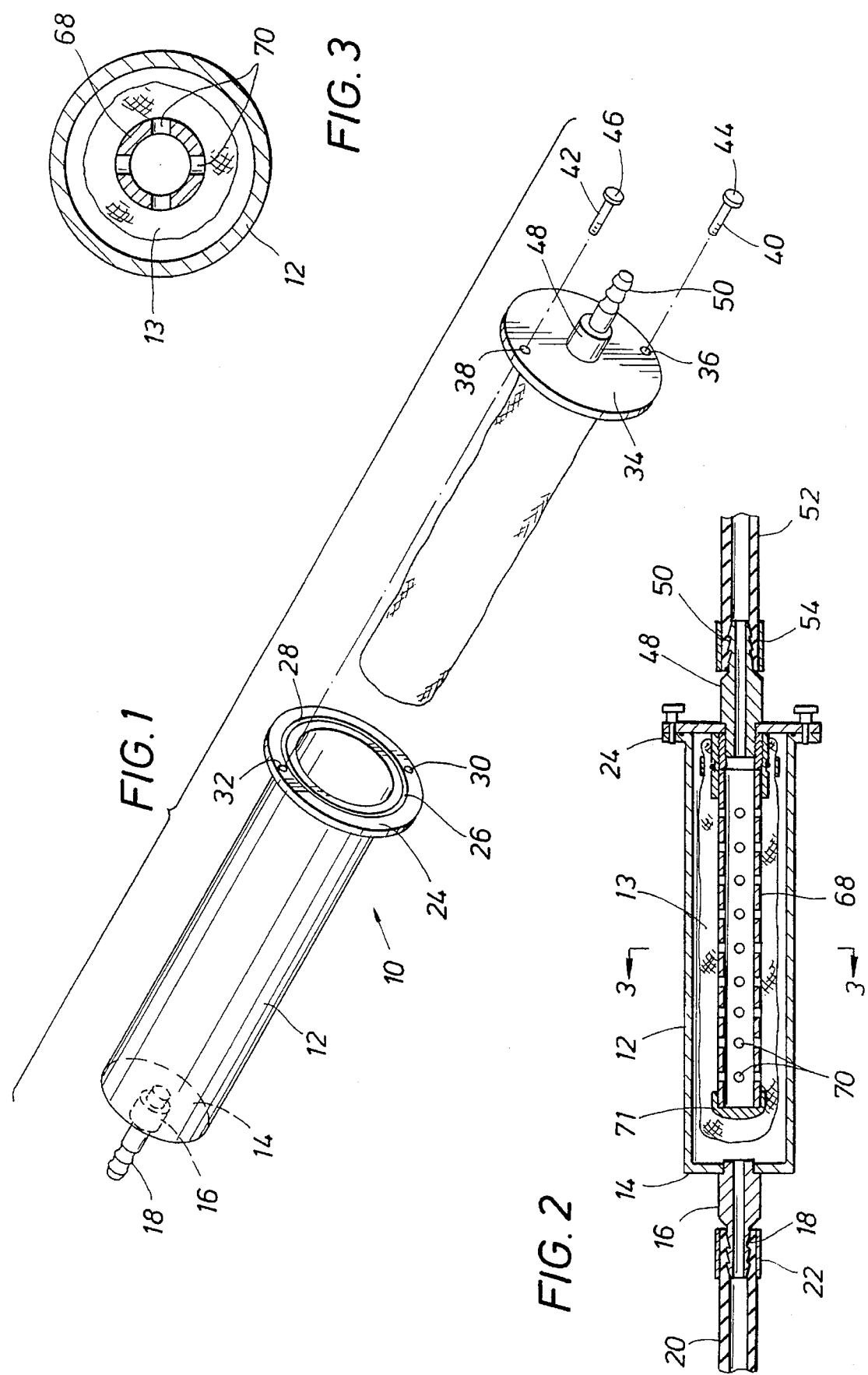

OIL FILTERING SYSTEM FOR BILGE WATER OF MARINE VESSELS

FIELD OF THE INVENTION

This invention relates generally to filtering systems for separating petroleum products such as oil, gasoline, diesel fuel, etc. from the bilge water of marine vessels to insure discharge of oil free water from the bilge into the surrounding water. More particularly, the present invention is directed to a bilge water filter system for marine vessels wherein filters may be employed individually or in filter banks depending on vessel size and bilge water volume and which function to retain collected petroleum products for subsequent environmentally safe disposal. Even more specifically, the present invention concerns oil collecting filters for the bilge water of marine vessels incorporating an internally supported, generally cylindrical sleeve of polypropylene pad through which bilge water is caused to flow and which efficiently separates petroleum products from the circulating water and retains them for subsequent disposal.

BACKGROUND OF THE INVENTION

For purposes of the present invention the term "oil" is intended to include a wide variety of petroleum products such as engine oil, lubricating oil, diesel fuel, gasoline, etc. In the operation of virtually all engine powered marine vessels having inboard engines a wide variety of petroleum products are utilized in conjunction with engine operation. During operation of the engine or engines a certain quantity of engine oil can be lost through engine seals and into the bilge of the vessel. Regardless of how clean and how well cared for is the engine system of the vessel it is virtually always the case that at least a small amount of engine oil is lost into the bilge. This engine oil tends to coat all of the exposed surfaces in the bilge and can combine with other contaminants such as dust, certain marine life to develop a coating or buildup of oily residue in the bilge. Also, during operation of the engine and during servicing of the engine, small amounts of lubricating oil are frequently lost into the bilge and some fuels or fuel components also find their way into the bilge due to minute leakage thereof during prolonged engine operation.

Inboard engines, especially in larger marine vessels typically have power output drive shafts that extend through seals in wall surfaces of the vessel, especially the bottom and transom surfaces. These rotary shaft seals are almost always subject to a small volume of water leakage as the shafts are rotated during vessel operation. This water leakage will build up in the bilge of the vessel; consequently it must be periodically removed from the bilge and pumped overboard by means of bilge water discharge lines having orifice openings externally of the vessel's hull. For the reason that leaked oil continuously collects in the bilge and leaked water through the shaft seals also collects in the bilge the bilge water in marine vessels is virtually always contaminated with oil that it picks up from bilge deposits. In the past, bilge water pumping systems have been provided which operate automatically or by manual selection and which function to pump bilge water, even though contaminated with oil out of the bilge of the vessel and into the surrounding water. Very few marine vessels are provided with any facility for separation of the oil from the bilge water and preventing oil from being discharged from the bilge and into the surrounding water. Also, under circumstances where bilge water filters have been employed, these filters are typically of containing a significant volume of oil; consequently they are not typically capable of providing for lengthy unattended service so that oil leakage from the filters becomes a problem. Certain marine vessels such as shrimp boats, oil well surface vessels and the like may operate for several days or weeks without returning to shore. In the case of bilge water filtering systems it is desirable even under extended use of this nature to provide bilge water filtering systems having the capability of being replenished or restored so that the vessel is always provided with the capability for efficiently filtering oil from the bilge water and thus insuring that no oil or other such debris is pumped overboard by the bilge pump system. Especially when marine vessels are operational for extended periods of time it is desirable for bilge water filtering systems thereof to have high volume oil retaining capability to thereby maximize the periods of efficient filter use and minimize the frequency of filter changes as the vessel is being operated.

SUMMARY OF THE INVENTION

It is a principle feature of the present invention to provide a novel bilge water filter system for separating oil from bilge water and having the capability of containing a large volume of oil before filter replacement becomes necessary.

It is also a feature of the present invention to provide a novel bilge water filtering system for marine vessels which envisions utilization of valve controlled filter banks providing for sequential, selective or simultaneous flow of bilge water through individual filters to thereby minimize the requirement for the changing of replaceable filters and to insure that no oil is pumped overboard from the vessel during its operation.

It is an even further feature of the present invention to provide a novel oil separation filter for the bilge water of marine vessels which is provided with an elongate, generally tubular filter media composed of an oil attracting material which is capable of containing a significant volume of collected oil for subsequent, safe disposal.

It is another important feature of the present invention to provide a novel oil separation filter for the bilge water of marine vessels wherein elongate, tubular, internally supported filter media is employed, composed of a polyolefin hydrocarbon such as meltblown polypropylene and which has the capability for acquiring a large volume of petroleum products and yet insuring discharge of substantially petroleum free water from the bilge of the vessel to the water in which the vessel is operating.

It is an even further feature of this invention to provide a novel oil collecting filter for the bilge water of marine vessels which is defined in easily replaceable cartridge form for quick and efficient change out in the event the filter media becomes contaminated to the point that its replacement is desired.

Briefly, the various objects and features of the present invention are realized through the provision of an oil separating filter assembly having an elongate, generally cylindrical or tubular housing having a clean water outlet at one end thereof. At the opposite end of the filter housing there is provided a connection flange having an o-ring gasket in assembly therewith. A filter support flange is adapted for releasable, ceiling engagement with the flange of the tubular housing and is provided with an inlet through which oil, contaminated water is conducted into the filter housing. This filter support flange is provided with an elongate, tubular perforated filter support about which is located an elongate tubular sleeve or sock that is composed of oil absorbing material, particularly a polyolefin hydrocarbon such as meltblown polypropylene. The inlet and outlet passages of the filter assembly are each adapted for connection to the flexible hoses of a bilge pump and bilge water discharge system of the vessel. Thus, the entire filter housing may be easily disconnected from the bilge water handling system of the vessel and may be easily replaced through the use of conventional tools. In this :manner, contaminated filters can be removed from the bilge water filtering system and stored until the vessel reaches its shore based facility so that the contaminated filter media can be suitably disposed of. Also if desired, the filter housing may be disassembled and the contaminated filter media thereof may be removed from its filter support and independently stored for subsequent disposal. The contaminated filter media may be replaced with a clean filter media without necessitating the use of special tools or equipment.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which:

FIG. 1 is an exploded illustration of a bilge water filter cartridge constructed in accordance with the present invention and adapted for connection into the pump discharge line of a bilge water pumping system of a marine vessel.

FIG. 2 is a sectional view of the assembled oil separation filter cartridge of FIG. 1 showing connection thereof into a bilge water discharge line of a marine vessel.

FIG. 3 is a sectional view taken along line 3—3 of FIG. 2.

DETAILED DESCRIPTION OF PREFERRED EMBODIMENT

Figure 4:
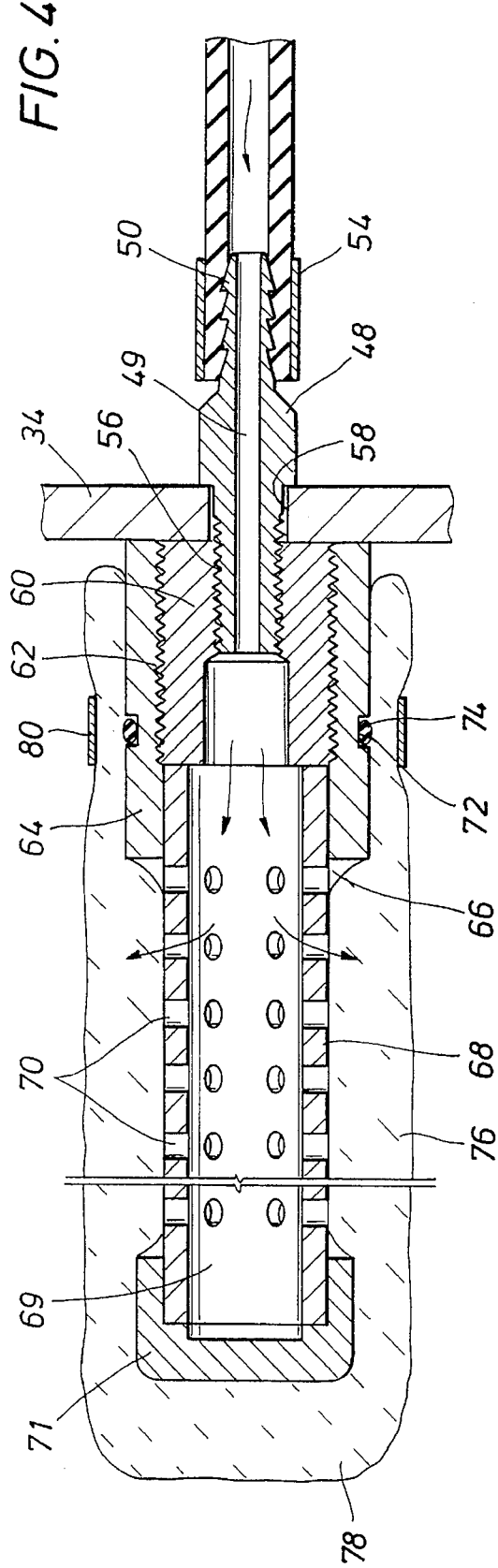
FIG. 4 is a fragmentary sectional view of the filter cartridge assembly of FIGS. 1 and 2 showing the inlet fitting and filter support structure thereof in detail.

Referring now to the drawings and first to FIGS. 1 and 2, an oil separation filter cartridge constructed in accordance with the present invention is shown generally at 10 and incorporates an elongate tubular housing 12 which may conveniently take the elongate cylindrical form that is shown particularly in FIGS. 1 and 2. The housing 12 is provided with a discharge end wall 14 which may be of circular, planar configuration as shown. The end wall 14 is provided with an outlet fitting 16 having a connection portion 18 which is adapted to receive an outlet conduit 20 in sealed assembly therewith. A tube clamp member 22 may be employed to secure the outlet conduit 20 in sealed assembly with the outlet fitting 16.

At the opposite end of the tubular housing 12 there is provided an access flange which is shown to be of circular configuration but which may take any other configuration as desired. The accessed flange 24 is provided with a circular seal recess 26 within which is received a circular sealing element 28 such as an o-ring gasket. The excess flange 24 is also provided with connection apertures 30 and 32 on opposed sides thereof. The connection apertures 30 and 32 may be internally threaded if desired.

A filter support flange 34 is provided having respective connection apertures 36 and 38 through which may extend the threaded sections 40 and 42 of flange retainer elements 44 and 46. Typically, the retainer elements 44 and 46 are in the form of knobs having a configuration permitting manual rotation thereof by servicing personnel. Centrally, of the filter support flange 34 there is provided an inlet fitting 48 having an elongate, tubular connecting section 50 by which a bilge water filter conduit 52 is received in sealed relation therewith. A retainer clamp 54 may be utilized to secure the bilge water conduit 52 in secured, sealed relation with the inlet fitting 48.

Referring now particularly to FIG. 4, the inlet fitting 48 is provided an externally threaded extension 56 which is received by the internally threaded opening 58 of the flange 34 and projects inwardly of the flange. An internally threaded connector element 60 is threaded to the inlet fitting extension 56 and serves to lock the fitting securely in assembly with the filter support flange 34. The connector element 60 is also provided with an externally threaded section 62 about which is threaded a tubular filter support member 64. Internally, the tubular filter support 64 is secured by any suitable means to the external surface area 66 of an elongate perforate filter support tube 68 having a multitude of perforations 70 formed therein.

The tubular filter support 64 is provided with an external seal groove 72 about the outer periphery thereof within which is located a circular sealing element 74 such as an elastomeric O-ring or the like.

An elongate tubular filter media 76 is positioned about the tubular filter support 64 and the perforate filter support element 68 and defines a closed end portion 78 that extends about the closed end 71 of the perforate tubular filter support. The open end portion of the filter media establishes engagement with the circular sealing element 74 and is secured to the tubular filter support 64 and the sealing element 74 by a circular retainer clamp 80. The bilge water that is forced by the bilge pump to flow through the inlet passage 49 of the inlet fitting 48 will be caused to flow into the central passage 69 of the perforate tube 68 and to flow through the perforations 70 and through the filter media 76. Any particulate that is contained within the flowing bilge water will thus be captured by the filter media.

The filter media is composed of an oil absorbing material such as a polyolefin hydrocarbon particularly meltblown polypropylene. This polyolefin hydrocarbon has been found quite satisfactory in the absorption of oil and has been successfully used in the form of pads, rolls, booms and pillows for absorption of oil from surfaces and oil that may be present on the surface of water. A particular manufacturer for meltblown polypropylene is the Oil-Dri Corporation of America of 520 North Michigan Avenue, Chicago, Ill. 60611. Heretofore, to the knowledge of the inventor, this particular product has not been employed to function as a filter for filtering oil from water.

Although the housing 12, the flanges 24 and 34 and the perforate filter support tube 68 may be composed of a metal such as stainless steel, aluminum, etc. these filter components may also be composed of anyone of a number of suitable oil resistant polymer materials. The housing 12 may be composed of clear polymer if desired to thus enable the visual inspection of the internal filter media from the standpoint of oil saturation. As a mixture of oil and water is caused to flow through the filter assembly the filter media has been proven quite satisfactory in the separation of the oil from the water so that the discharge of the filter through the discharge line 20 is water. The discharge line 20 of course will be connected to a suitable hull opening fitting of the marine vessel, thereby enabling the water output of the filter to be discharged overboard.

Figure 5:
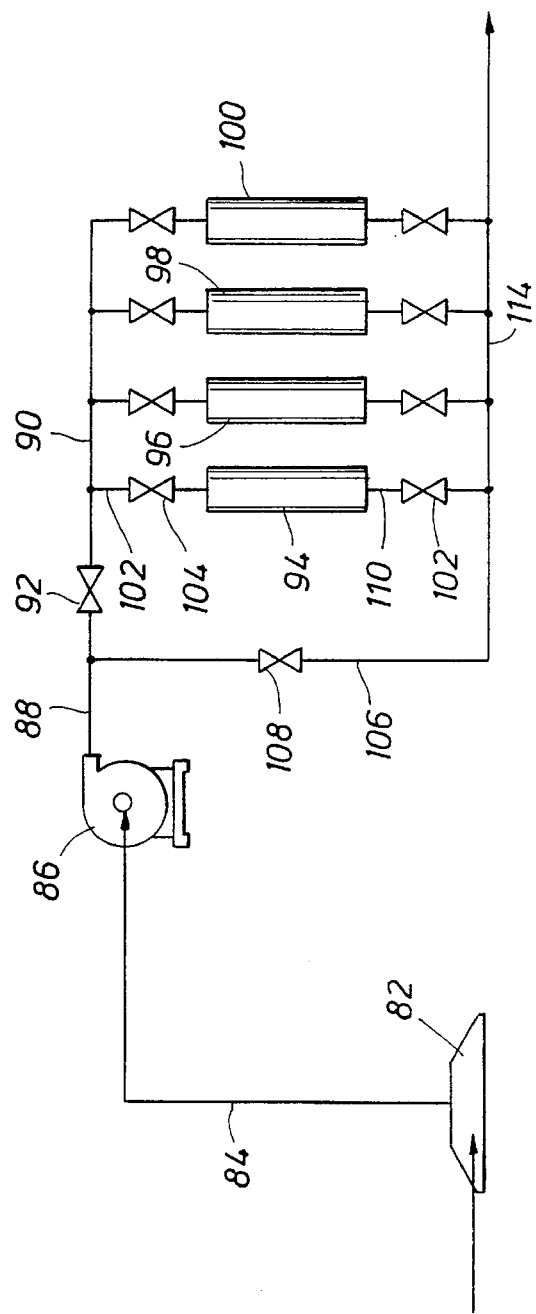
FIG. 5 is a schematic illustration of a bilge water discharge system of a marine vessel and showing a valve controlled bank of oil separation filters constructed in accordance with the present invention and being adapted for use independently, selectively or collectively for the purpose of separating oil from the bilge water of the marine vessel.

Referring now to FIG. 5, there is shown the bilge water filter system of a marine vessel having a plurality of individual filters each being valve controlled so that they may be utilized independently, sequentially or together to provide a bilge water oil removal system having a significant volume of oil retention so that frequent filter changing is not necessary. As shown in FIG. 5 there is provided a bilge water pickup device 82 which will typically be located on the internal bottom wall of the hull of the vessel, particularly at the lowest point of the hull. Bilge water that is present within the hull will flow into the pickup device 82 by virtue of its presents on the bottom portion of the hull and will then be caused to flow through the suction line 84 by the suction of a bilge water pump 86. The bilge water is then discharged under pressure provided by the pump through a bilge water discharge line 88 having an inlet discharge manifold line 90 which is controlled by a valve 92. This valve may be manually controlled if desired or, in the alternative, it may be mechanically or electrically controlled from a control panel or from any other suitable location. In fact, each of the valves that are provided in the filter bank system shown in FIG. 5 may be manually or remotely controlled as desired.

In the embodiment shown in FIG. 5 four filters 94, 96, 98 and 100 are shown each having inlet branch lines as shown at 102 through which bilge water is supplied to the filter under the control of a branch selector valve 104. The bilge water handling system of FIG. 5 also includes a discharge manifold line 106 having a bypass valve 108 which will typically be normally closed but which will be open to permit pump discharge from line 88 to bypass the filters, such as under emergency conditions. As indicated by filter 94 each of the filters is provided with a filter outlet line 110 having an outlet control valve 112 for permitting filter discharge to enter a discharge manifold line 114. The discharge manifold line 114 is then connected with the discharge fitting of the vessel hull for discharge of filtered water overboard.

The inlet and outlet valves of each of the filters 94–100 may be independently controlled for bilge water filtering as desired. For example, initially the valves 104 and 112 of the filter 94 may be open while the valves of the filters 96, 98 and 100 may be closed. Under this condition, with the valve 92 open and the valve 108 closed all of the bilge water from the pickup 82 will be caused to flow only through the filter 94. The other filters of the bank, 96, 98 and 100 will in this case be permitted to remain in reserve. When the filter 94 becomes contaminated to the point that it will no longer provide efficient filtering of the oil from the bilge water, its valves 104 and 112 may be closed and the inlet and outlet valves of another one of the filters may be opened. Thus, the filter may be used individually or sequentially. Under circumstances where high volume bilge water filtering and discharge is necessary all are most of the inlet and outlet valves of the filters may be opened and the filters may be utilized simultaneously for filtering activity. The use of multiple filters as shown in FIG. 5 also permits bilge water filtering to occur over long periods of time without necessitating physical change of the filter media. Thus, even when the vessel is at sea for a number of days or weeks it may not be necessary to change out the filter media until the vessel returns to port and receives normal preventative maintenance.

In the event it becomes desirable to replace the filter media in a filter service personnel will simply manually unloosen the retainer bolts 40 and 42, thereby permitting the filter support flange 34 to be separated from the access flange 24. With the retainer bolts removed the filter support flange is moved away from the access flange to withdraw the filter support and filter media assembly from the internal chamber 13 of the housing. After this has been done, the retainer clamp 80 is loosened to thereby permit the elongate filter media tube to be removed from about the support 64 and the perforate support tube 68. The contaminated filter media will then be placed in a suitable receptacle for storage until its disposal is accomplished at a port facility. A replacement filter media sleeve will then be assembled in the position shown in FIG. 4 and secured in place simply by tightening the filter retainer clamp 80. After this has been done the filter assembly will be inserted into the filter housing and the flange 34 will be brought into assembly with the access flange and locked in assembly therewith by the retainer bolts 40 and 42.

The filter media 76 in addition to being of sleeve-like configuration for fairly close fit about the perforate filter support tube and the tubular support element 64, is provided as a substantially thick, generally cylindrical sleeve. The exceptional thickness of the filter sleeve and the character of the meltblown polypropylene (polyolefin hydrocarbon) provides a bilge water filter assembly that may be utilized for significantly extended periods in the filtering of bilge water, while retaining virtually all of the oil that might be contained in the bilge water to thus insure that the bilge water discharge overboard will contain virtually no oil. Further, the use of multiple filters in selective, sequentially or simultaneous manner as discussed above will provide most marine vessels with the capability of operating for extended periods without necessitating the change of the filter media. If the filter media should need changing it can be accomplished simply and efficiently without the use of special tools.

Figure 6:
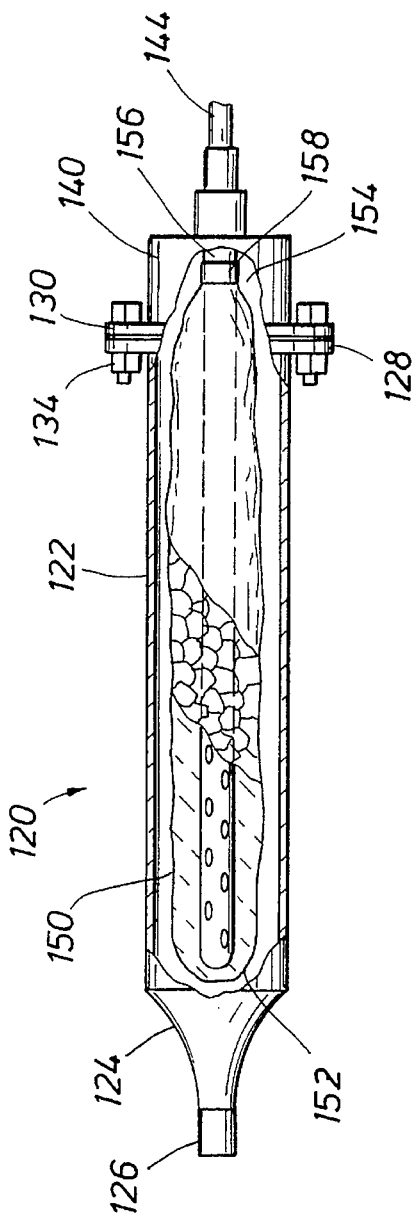
FIG. 6 is an elevational view having parts thereof broken away and shown in section, illustrating a bilge water filter representing an alternative embodiment of this invention.
Figure 7:
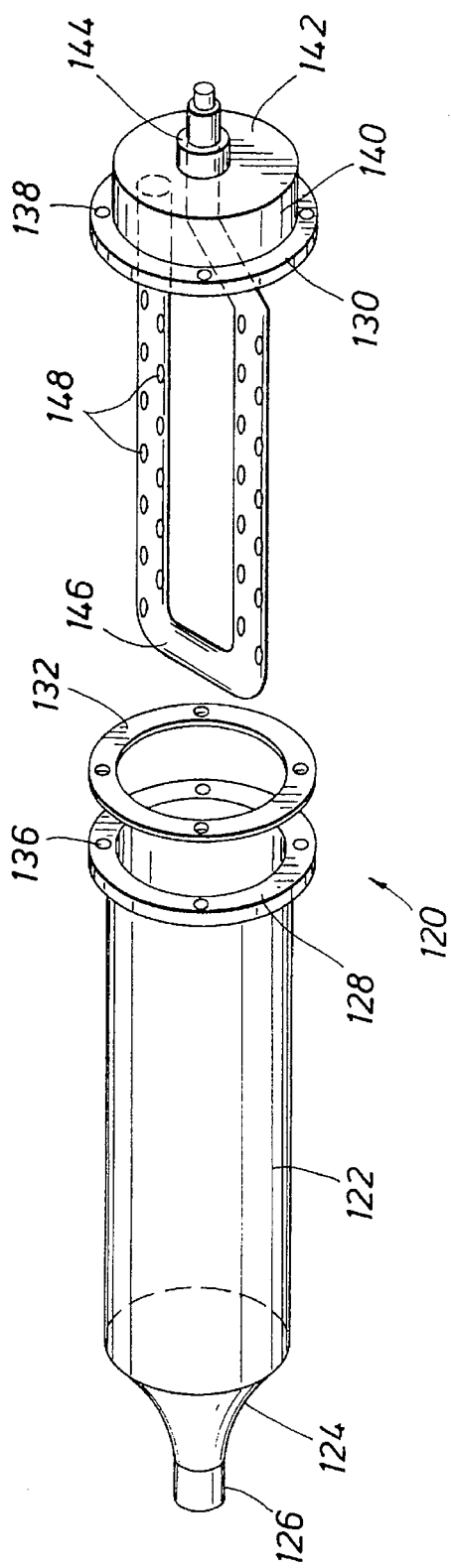
FIG. 7 is an exploded isometric illustration showing the bilge water filter apparatus of FIG. 6.

Referring now to FIGS. 6 and 7, a bilge water filter for marine vessels representing an alternative embodiment of this invention is shown generally at 120 and defines an elongate filter housing 122 of generally cylindrical configuration having a tapered outlet end 124 which terminates at an outlet fitting 126 which is adapted to receive an outlet conduit, such as a flexible hose for discharge of filtered water overboard in similar manner as shown at 20 in FIG. 2. Typically the outlet conduit will be secured to the fitting 126 by a suitable clamp member such as the clamp 22 of FIG. 2. At the opposite end of the cylindrical housing 122 there is provided an access flange 128 which receives a filter support flange 130 in assembly therewith. The flanges 128 and 120 are maintained in sealed assembly by a flange gasket member 132 which is held in place by a plurality of retainer bolts 134 that extend through registering openings 136 and 138 in the respective flanges 128 and 130.

For filter support an inlet housing section 140 of generally cylindrical configuration is connected in fixed relation to the support flange 130 and is provided with a generally planar circular end wall 142 having a bilge water inlet fitting 144 in supported assembly therewith. The inlet fitting is adapted to receive an inlet conduit similar to the conduit 52 of the embodiment shown in FIG. 2.

An elongate, generally U-shaped filter support tube 146 is secured to the planar end wall 142 by the inlet fitting 144 and has a multitude of openings or perforations 148 therein through which bilge water emerges from the filter support tube. The U-shaped filter support tube, as shown in FIG. 6, is encompassed by a body of filter media 150 of bag-like form having a closed end 152 and an open end 154. The open end is secured about a non-perforated portion 156 of the U-shaped support tube by means of a suitable clamp 158.

In view of the foregoing, it is thus seen that the present invention is one well adapted to attain all of the various objects and features hereinabove set forth together with other features that are inherent in the apparatus disclosed herein.

As will be readily apparent to those skilled in the art the present invention may be produced in other specific forms without departing from its spirit or essential characteristics. The present embodiment is therefore to be considered only as illustrative and not restrictive, the scope of the invention being indicated by the claims rather than the foregoing description, and all changes which come within the meaning and range of the equivalence of the claims are therefore intended to be embraced therein.

What is claimed is:

1. An oil separator filter assembly for separating oil from the bilge water of marine vessels, comprising:

(a) a generally cylindrical filter housing defining an internal filter chamber and having a closed end having a filter outlet coupling for receiving a discharge conduit through which filtered bilge water is discharged overboard, said filter housing having an access flange defining an access opening;

(b) a closure and filter support plate being disposed in removable sealed assembly with said access flange of said filter housing and having a filter inlet connection for connection with a supply conduit through which contaminated bilge water is caused to flow into said internal filter chamber;

(c) an elongate perforate tubular filter positioning and supply element being located within said filter housing and having first and second ends, said first end defining a tubular filter support being supported by said closure and filter support plate and being in fluid conducting communication with said filter inlet, said second end of said elongate perforate tubular filter positioning and supply element being closed and being spaced from said closed end of said filter housing; and (d) a tubular filter media having an open end and a closed end, said open end being secured about said tubular filter support of said elongate perforate filter positioning and supply element and being adapted to retain oil separated from said bilge water during flow of oil contaminated bilge water therethrough.

2. The oil separator filter of claim 1, wherein:

said filter media is composed of a polyolefin hydrocarbon.

3. The oil separator filter of claim 2, wherein:

said polyolefin hydrocarbon comprising meltblown polypropylene.

4. The oil separator filter of claim 1, wherein said filter inlet connection comprises:

(a) an inlet fitting being supported by said closure and filter support plate and defining said inlet and having a threaded portion thereof projecting through said closure and filter support plate and into said internal chamber;

(b) a support element being located within said internal chamber and being received by said threaded portion of said inlet fitting, said support element having an end surface thereof in retaining engagement with said closure and filter support plate and;

(c) said elongate perforate filter positioning and supply element being in supported engagement with said support element.

5. The oil separator filter of claim 4, wherein:

(a) seal means being located about said support element and establishing substantially sealed relation with said open end of said filter media; and (b) retainer means being located about said open end of said filter media and securing said filter media into said substantially sealed relation with said seal means.

6. An oil separator system for the bilge water of marine vessels, comprising:

(a) a bilge water pick-up having suction passage means;

(b) pump means being connected to said suction passage means of said bilge water pick-up and having pump discharge passage means;

(c) at least one oil separator filter assembly comprising:

(1) a generally cylindrical filter housing defining an internal filter chamber and having a closed end having a filter outlet coupling for receiving a discharge conduit through which filtered bilge water is discharged overboard, said filter housing having an access flange defining an access opening;

(2) a closure and filter support plate being disposed in removable sealed assembly with said access flange of said filter housing and having a filter inlet connection for connection to a supply conduit through which contaminated bilge water is caused to flow into said internal filter chamber;

(3) an elongate perforate tubular filter positioning and supply element being located within said filter housing and having first and second ends, said first end defining a tubular filter support being supported by said closure and filter support plate and being in fluid conducting communication with said filter inlet, said second end of said elongate perforate tubular filter positioning and supply element being closed and being spaced from said closed end of said filter housing; and (4) a tubular filter media having an open end and a closed end, said open end being secured about said tubular filter support of said elongate perforate filter positioning and supply element and being adapted to retain oil separated from said bilge water during flow of oil contaminated bilge water therethrough; and (d) filtered bilgewater discharge conduit means being in connection with said filter outlet coupling and having a filtered bilgewater outlet for discharge of filtered bilgewater overboard.

7. The oil separator system of claim 6, wherein said elongate perforate tubular filter positioning and supply element further comprises:

(a) an inlet fitting being fixed to said filter support plate and projecting into said elongate tubular housing and having an internal passage therein for conducting bilge water into said elongate tubular housing;

(b) said elongate perforate tubular filter positioning and supply element being located within said elongate filter housing and having one end thereof in supported connection with said inlet fitting;

(c) said open end of said elongate tubular filter media being located about said elongate perforate tubular filter positioning and supply element; and (d) a circular retainer clamp retaining said open end of said elongate tubular filter media in sealed assembly about said elongate perforate tubular filter positioning and supply element.

8. The oil separator system of claim 7, wherein:

(a) said inlet fitting having an externally threaded section located within said elongate tubular housing;

(b) a tubular support element having internal threads receiving said external threaded section of said inlet fitting and having an end surface disposed in engagement with said filter support flange;

(c) said elongate perforate filter support tube being supported by said tubular support element.

9. The oil separator system of claim 6, wherein:

(a) an inlet fitting being supported by said closure and filter support plate and defining said inlet and having a threaded portion thereof projecting through said closure and filter support plate and into said internal chamber;

(b) a support element being located within said internal chamber and being received by said threaded portion of said inlet fitting, said support element having an end surface thereof in retaining engagement with said closure and filter support flange plate and;

said elongate perforate filter positioning and supply means element being in supported engagement with said support element.

10. The oil separator of claim 9, wherein:

(a) seal means being located about said support element and establishing substantially sealed relation with said open end of said filter media; and (b) retainer means being located about said open end of said filter media and securing said filter media into said substantially sealed relation with said seal means.

* * * * *